US012621771B2

(12) United States Patent (10) Patent No.: US 12,621,771 B2

Lu (45) Date of Patent: May 5, 2026

(54) INFORMATION CONFIGURATION METHOD, APPARATUS AND DEVICE, AND STORAGE MEDIUM

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 452 days.

(21) Appl. No.: 17/891,616

(22) Filed: Aug. 19, 2022

(65) Prior Publication Data

US 2022/0408363 A1 Dec. 22, 2022

Related U.S. Application Data

(63) Continuation of application No. PCT/CN2020/081445, filed on Mar. 26, 2020.

(51) Int. Cl.
*H04W 52/02* (2009.01)
*H04W 4/40* (2018.01)

(52) U.S. Cl.
CPC ......... *H04W 52/0235* (2013.01); *H04W 4/40* (2018.02); *H04W 52/0206* (2013.01)

(58) Field of Classification Search
CPC ............... H04W 4/40; H04W 52/0206; H04W 52/0216; H04W 52/0229; H04W 52/0235; H04W 72/20; H04W 76/14
USPC ......... 455/574, 450, 456.1, 522, 458, 435.1, 455/437, 436, 418, 524
See application file for complete search history.

(56) References Cited

U.S. PATENT DOCUMENTS 6,642,894 B1 * 11/2003 Gross ..................... H01Q 21/29
343/705
6,735,438 B1 * 5/2004 Sabatino ................ H01Q 1/246
343/705

(Continued)

FOREIGN PATENT DOCUMENTS

CN 105451211 A 3/2016
CN 110381463 A 10/2019

(Continued)

OTHER PUBLICATIONS

First Office Action of the Japanese application No. 2022-555713, issued on Oct. 27, 2023. 12 pages with English translation.

(Continued)

*Primary Examiner* — Joseph Arevalo

(74) *Attorney, Agent, or Firm* — PERKINS COIE LLP

(57) ABSTRACT

The present application relates to an information configuration method, apparatus and device, and a storage medium. A first UE receives configuration information sent by a second UE, and because the configuration information is used for indicating data transceiving-related parameters under a power saving mechanism of a side link between the first UE and the second UE, the purpose of power saving can be achieved when the first UE and the second UE communicate with each other by using the data transceiving-related parameters indicated by the configuration information; moreover, the purpose of the configuration information is to perform data transceiving under the power saving mechanism of the side link between the first UE and the second UE.

8 Claims, 7 Drawing Sheets

(56) References Cited

U.S. PATENT DOCUMENTS

| | | | | |
|---|---|---|---|---|
| 6,795,699 | B1 * | 9/2004 | McCraw | H04B 7/18504 455/406 |
| 6,804,515 | B1 * | 10/2004 | McCraw | H04B 7/18504 455/431 |
| 6,856,803 | B1 * | 2/2005 | Gross | H04B 7/18506 455/431 |
| 6,968,187 | B1 * | 11/2005 | Irwin | H04B 7/18504 455/13.1 |
| 10,011,352 | B1 * | 7/2018 | Dahlstrom | G05D 1/0088 |
| 10,555,259 | B2 | 2/2020 | Jung et al. | |
| 11,235,890 | B1 * | 2/2022 | Dahlstrom | B64D 1/18 |
| 11,943,062 | B2 * | 3/2024 | Kim | H04W 74/0833 |
| 2015/0245295 | A1 | 8/2015 | Jha et al. | |
| 2016/0366645 | A1 | 12/2016 | Song et al. | |
| 2017/0019800 | A1 * | 1/2017 | Liu | H04W 72/0446 |
| 2017/0230941 | A1 | 8/2017 | Agiwal et al. | |
| 2018/0317123 | A1 | 11/2018 | Chen et al. | |
| 2020/0229206 | A1 * | 7/2020 | Badic | G05D 1/225 |
| 2020/0344722 | A1 * | 10/2020 | He | H04W 72/02 |
| 2020/0396633 | A1 * | 12/2020 | Tseng | H04L 5/001 |
| 2021/0037468 | A1 * | 2/2021 | Huang | H04W 72/044 |
| 2022/0007403 | A1 * | 1/2022 | Li | H04L 1/08 |
| 2022/0272568 | A1 * | 8/2022 | Lee | H04W 52/0229 |
| 2022/0361283 | A1 * | 11/2022 | Liu | H04W 52/0235 |
| 2022/0394702 | A1 * | 12/2022 | Lee | H04L 5/0069 |
| 2023/0024646 | A1 * | 1/2023 | Park | H04W 76/28 |
| 2024/0029541 | A1 * | 1/2024 | Millican | G06V 20/52 |

FOREIGN PATENT DOCUMENTS

| | | |
|---|---|---|
| EP | 3609234 A1 | 2/2020 |
| WO | 2018064477 A1 | 4/2019 |
| WO | 2019061422 A1 | 4/2019 |

OTHER PUBLICATIONS

First Office Action of the European application No. 20926607.1, issued on Sep. 21, 2023. 7 pages.

International Search Report Mailed Dec. 16, 2022 In Application No. PCT/CN2020081445.

Written Opinion Mailed Dec. 16, 2020 In Application No. PCT/CN2020/081445, 8 pages.

Intel Corporation, Considerations for power saving, 3GPP TSG RAN WG2 Meeting #95, R2-164838, Göteborg, Sweden, Aug. 22-26, 2016, 2 pages.

Zte, Initial consideration on NR V2X resource allocation, 3GPP TSG-RAN WG2#103bis, R2-1814168, Chengdu, China, Oct. 8-12, 2018, 7 pages.

LG Electronics, New WID on NR sidelink enhancement, 3GPP TSG RAN Meeting #86, RP-193231 (RP-193257), Sitges, Spain, Dec. 9-12, 2019, 6 pages.

Ericsson "Introducing Sidelink SPS" R2-168636; 3GPP TSG-RAN WG2 Meeting #96; Reno, Nevada; USA; Nov. 14-18, 2016. 12 pages.

Extended European Search Report for European Application No. 20926607.1 issued Jan. 2, 2023. 9 pages.

First Office Action of the Chinese application No. 202211494623.X, issued on May 8, 2024. 14 pages with English translation.

Examination report of the European application No. 20926607.1, issued on Apr. 4, 2024. 7 pages.

Notice of preliminary rejection of the Korean application No. 10-2022-7029610 issued on May 26, 2025, 9 pages with English translation.

ETSI, 3GPP TS 36.331 version 15.8.0 Release 15 (Jan. 2020), LTE; Evolved Universal Terrestrial Radio Access (E-UTRA); Radio Resource Control (RRC); Protocol specification, 969 pages.

The First Examination Report of the Indian application No. 202217047746, issued on Oct. 9, 2025. 6 pages.

* cited by examiner

A first UE receives configuration information sent by
a second UE; and the configuration information is used
for indicating a data transmission and reception related
parameter under a power saving mechanism of a side
link between the first UE and the second UE          S101

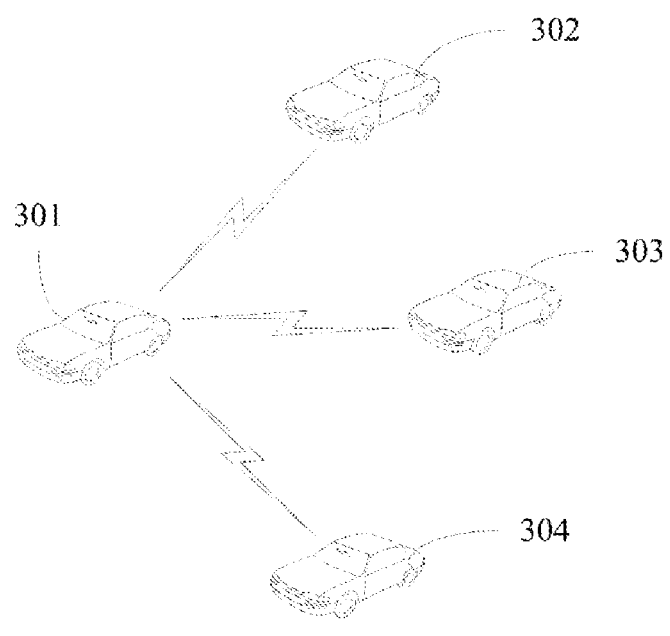

FIG. 3A

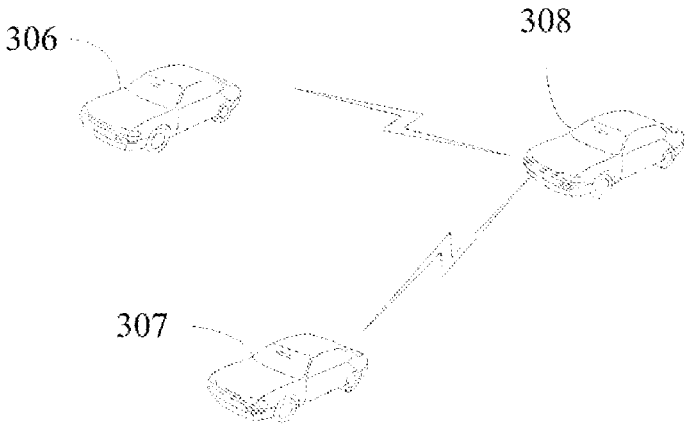

FIG. 3B

| A first UE receives configuration information sent by a second UE; and the configuration information is used for indicating a data transmission and reception related parameter under a power saving mechanism of a side link between the first UE and the second UE | S201 |

| The first UE sends a response message to the second UE; and the response message is used for indicating whether the first UE accepts the data transmission and reception related parameter indicated by the configuration information | S202 |

FIG. 4

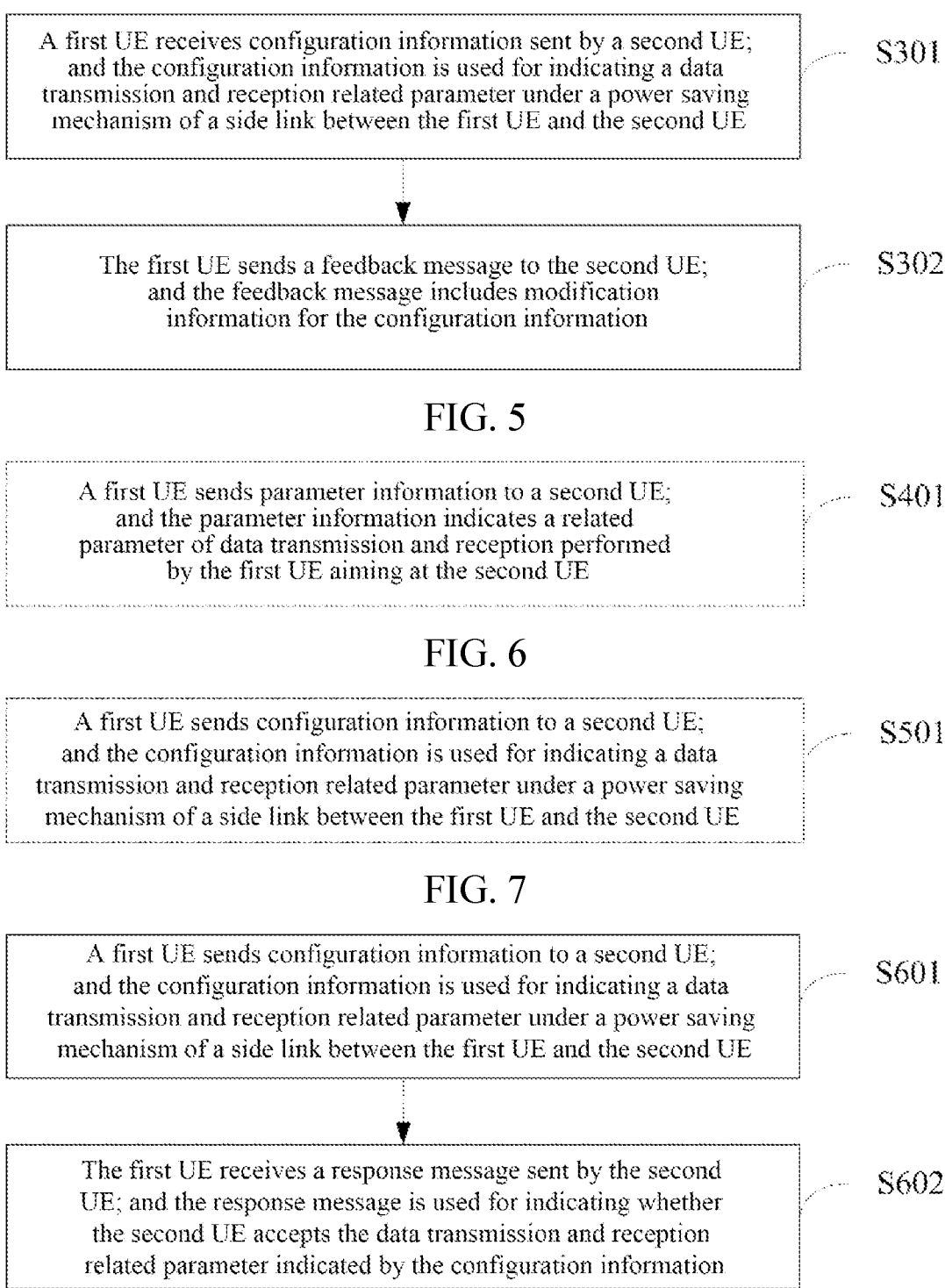

A first UE receives configuration information sent by a second UE; and the configuration information is used for indicating a data transmission and reception related parameter under a power saving mechanism of a side link between the first UE and the second UE — S301

The first UE sends a feedback message to the second UE; and the feedback message includes modification information for the configuration information — S302

FIG. 5

A first UE sends parameter information to a second UE; and the parameter information indicates a related parameter of data transmission and reception performed by the first UE aiming at the second UE — S401

FIG. 6

A first UE sends configuration information to a second UE; and the configuration information is used for indicating a data transmission and reception related parameter under a power saving mechanism of a side link between the first UE and the second UE — S501

FIG. 7

A first UE sends configuration information to a second UE; and the configuration information is used for indicating a data transmission and reception related parameter under a power saving mechanism of a side link between the first UE and the second UE — S601

The first UE receives a response message sent by the second UE; and the response message is used for indicating whether the second UE accepts the data transmission and reception related parameter indicated by the configuration information — S602

FIG. 8

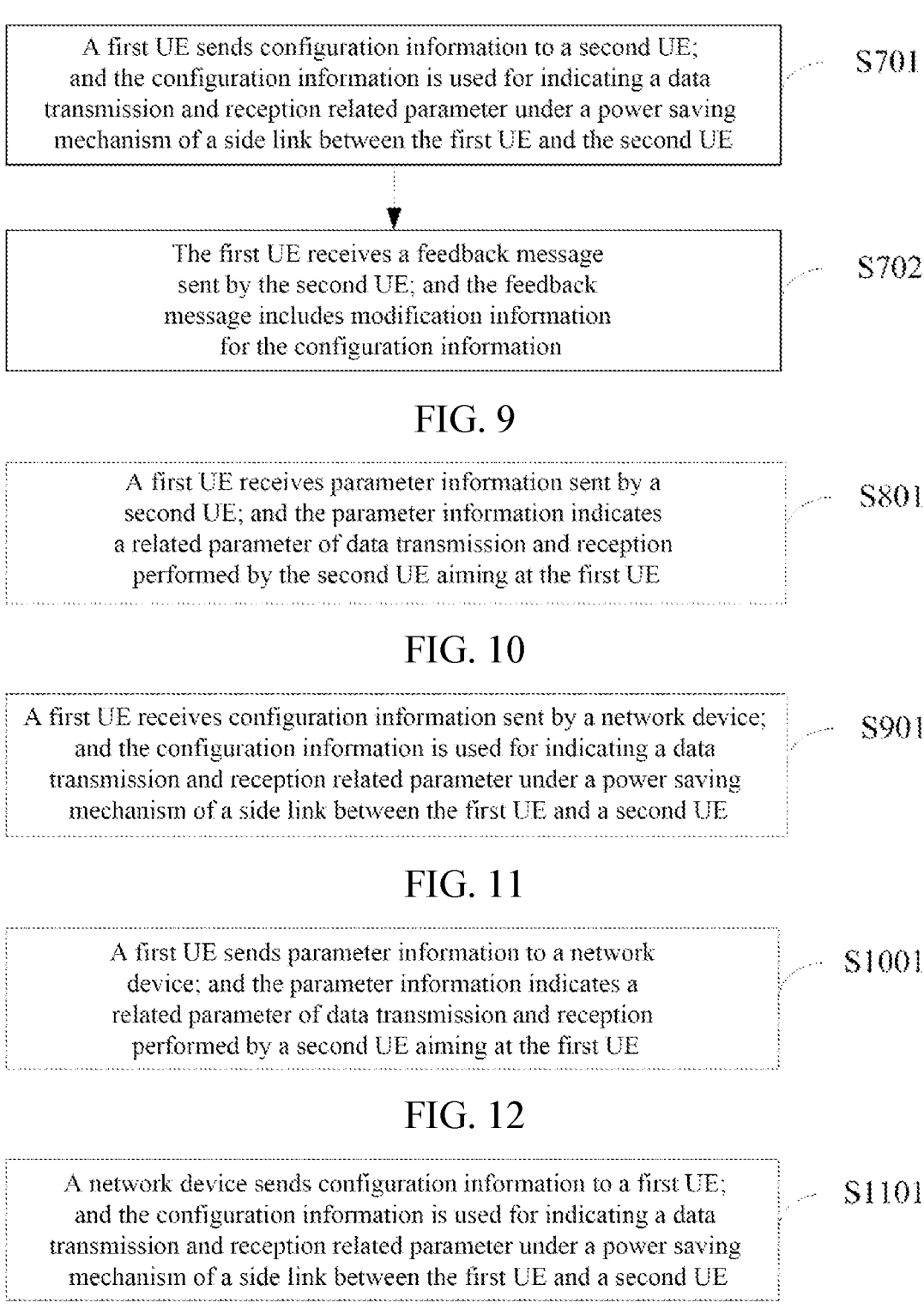

A first UE sends configuration information to a second UE; and the configuration information is used for indicating a data transmission and reception related parameter under a power saving mechanism of a side link between the first UE and the second UE ⟶ S701

The first UE receives a feedback message sent by the second UE; and the feedback message includes modification information for the configuration information ⟶ S702

FIG. 9

A first UE receives parameter information sent by a second UE; and the parameter information indicates a related parameter of data transmission and reception performed by the second UE aiming at the first UE ⟶ S801

FIG. 10

A first UE receives configuration information sent by a network device; and the configuration information is used for indicating a data transmission and reception related parameter under a power saving mechanism of a side link between the first UE and a second UE ⟶ S901

FIG. 11

A first UE sends parameter information to a network device; and the parameter information indicates a related parameter of data transmission and reception performed by a second UE aiming at the first UE ⟶ S1001

FIG. 12

A network device sends configuration information to a first UE; and the configuration information is used for indicating a data transmission and reception related parameter under a power saving mechanism of a side link between the first UE and a second UE ⟶ S1101

FIG. 13

A network device receives parameter information sent
by a first UE; and the parameter information indicates
a related parameter of data transmission and reception
performed by a second UE aiming at the first UE
~ S1201
FIG. 14
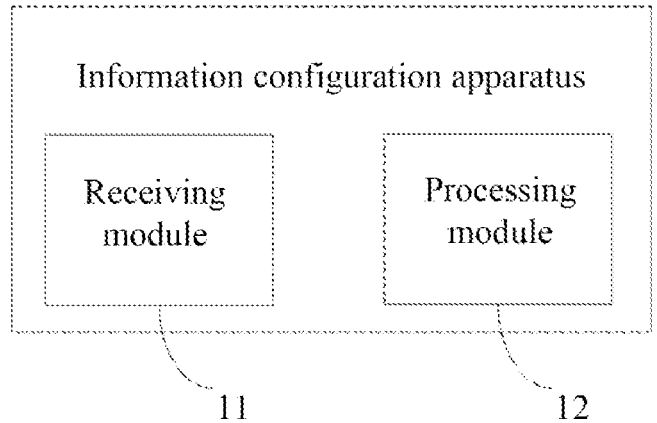
FIG. 15
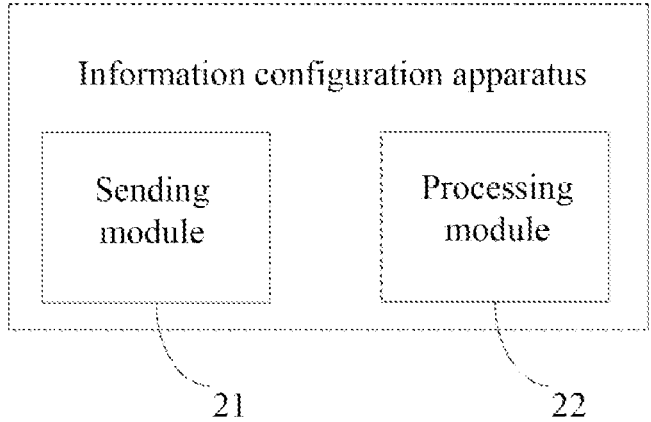
FIG. 16

INFORMATION CONFIGURATION METHOD, APPARATUS AND DEVICE, AND STORAGE MEDIUM

CROSS-REFERENCE TO RELATED APPLICATION

This application is a continuation application of International Application No. PCT/CN2020/081445, filed on Mar. 26, 2020, the entire disclosure of which is hereby incorporated by reference.

TECHNICAL FIELD

The present application relates to the field of communication, and more particularly, to an information configuration method and apparatus, a device, and a storage medium.

BACKGROUND

Side Link (SL) communication is wireless communication directly performed between two or more pieces of User Equipment (UE). In SL communication, two or more UEs that are geographically close to each other can communicate directly without communicating through a base station.

Currently, SL communication is supported and commonly used in communication such as Device-to-Device (D2D) or Vehicle-to-Everything (V2X). Use of a terminal has become very common, power consumption is used as an important indicator of the terminal, and in some scenarios, the terminal needs to meet a requirement of low power consumption, thus in some scenarios of SL communication, a power saving mechanism needs to be set up in SL communication, for example, in some specific time periods or specific states, the terminal is controlled to enter a sleep state, or a purpose of reducing power consumption is achieved by means of discontinuous reception/transmission.

SUMMARY

In view of this, an information configuration method and apparatus, a device, and a storage medium are necessary.

In a first aspect, an implementation of the present disclosure provides an information configuration method, and the method includes: receiving, by a first User Equipment (UE), configuration information sent by a second UE; wherein the configuration information is used for indicating a data transmission and reception related parameter under a power saving mechanism of a side link between the first UE and the second UE.

In a second aspect, an implementation of the present disclosure provides an information configuration method, and the method includes: sending, by a first User Equipment (UE), configuration information to a second UE; wherein the configuration information is used for indicating a data transmission and reception related parameter under a power saving mechanism of a side link between the first UE and the second UE.

In a third aspect, an implementation of the present disclosure provides an information configuration method, and the method includes: receiving, by a first User Equipment (UE), configuration information sent by a network device; wherein the configuration information is used for indicating a data transmission and reception related parameter under a power saving mechanism of a side link between the first UE and a second UE.

In a fourth aspect, an implementation of the present disclosure provides an information configuration method, and the method includes: sending, by a network device, configuration information to a first User Equipment (UE); wherein the configuration information is used for indicating a data transmission and reception related parameter under a power saving mechanism of a side link between the first UE and a second UE.

In a fifth aspect, an implementation of the present disclosure provides an information configuration apparatus, which includes a receiving module and a processing module, wherein the processing module is used to receive configuration information sent by a second User Equipment (UE) through the receiving module; and the configuration information is used for indicating a data transmission and reception related parameter under a power saving mechanism of a side link between a first UE and the second UE.

In a sixth aspect, an implementation of the present disclosure provides an information configuration apparatus, which includes a sending module and a processing module, wherein the processing module is used to send configuration information to a second User Equipment (UE) through the sending module; and the configuration information is used for indicating a data transmission and reception related parameter under a power saving mechanism of a side link between a first UE and the second UE.

In a seventh aspect, an implementation of the present disclosure provides an information configuration apparatus, which includes a receiving module and a processing module, wherein the processing module is used to receive configuration information sent by a network device through the receiving module; and the configuration information is used for indicating a data transmission and reception related parameter under a power saving mechanism of a side link between a first User Equipment (UE) and a second UE.

In an eighth aspect, an implementation of the present disclosure provides an information configuration apparatus, which includes a sending module and a processing module, wherein the processing module is used to send configuration information to a first User Equipment (UE) through the sending module; and the configuration information is used for indicating a data transmission and reception related parameter under a power saving mechanism of a side link between the first UE and a second UE.

In a ninth aspect, an implementation of the present disclosure provides a terminal device including a processor, a memory, and a transceiver, wherein the processor, the memory, and the transceiver communicate with each other through an internal connection path, the memory is used to store program codes; and the processor is used to invoke program codes stored in the memory to cooperate with the transceiver to implement acts of any one of the methods of the first aspect.

In a tenth aspect, an implementation of the present disclosure provides a terminal device including a processor, a memory, and a transceiver, wherein the processor, the memory, and the transceiver communicate with each other through an internal connection path, the memory is used to store program codes; and the processor is used to invoke program codes stored in the memory to cooperate with the transceiver to implement acts of any one of the methods of the second aspect.

In an eleventh aspect, an implementation of the present disclosure provides a terminal device including a processor, a memory, and a transceiver, wherein the processor, the memory, and the transceiver communicate with each other through an internal connection path, the memory is used to store program codes; and the processor is used to invoke program codes stored in the memory to cooperate with the transceiver to implement acts of any one of the methods of the third aspect.

In a twelfth aspect, an implementation of the present disclosure provides a network device including a processor, a memory, and a transceiver, wherein the processor, the memory, and the transceiver communicate with each other through an internal connection path, the memory is used to store program codes; and the processor is used to invoke program codes stored in the memory to cooperate with the transceiver to implement acts of any one of the methods of the fourth aspect.

In a thirteenth aspect, an implementation of the present disclosure provides a computer readable storage medium on which a computer program is stored, wherein when the computer program is executed by a processor, acts of any one of the methods of the first aspect are implemented.

In a fourteenth aspect, an implementation of the present disclosure provides a computer readable storage medium on which a computer program is stored, wherein when the computer program is executed by a processor, acts of any one of the methods of the second aspect are implemented.

In a fifteenth aspect, an implementation of the present disclosure provides a computer readable storage medium on which a computer program is stored, wherein when the computer program is executed by a processor, acts of any one of the methods of the third aspect are implemented.

In a sixteenth aspect, an implementation of the present disclosure provides a computer readable storage medium on which a computer program is stored, wherein when the computer program is executed by a processor, acts of any one of the methods of the fourth aspect are implemented.

For an information configuration method and apparatus, a device, and a storage medium according to the implementations of the present application, the first UE receives the configuration information sent by the second UE, since the configuration information is used for indicating the data transmission and reception related parameter under the power saving mechanism of the side link between the first UE and the second UE, when the first UE and the second UE communicate through the data transmission and reception related parameter indicated by the configuration information, a purpose of power saving may be achieved; and a purpose of the configuration information is to perform data transmission and reception under the power saving mechanism of the side link between the first UE and the second UE, then, under the power saving mechanism of the side link, when the first UE and the second UE perform data transmission and reception through the data transmission and reception related parameter indicated by the configuration information, there is no problem of a conflict between data reception and data transmission or a conflict between an active state and a sleep state of a terminal, thereby improving a data transmission efficiency and avoiding a problem of data transmission failure.

BRIEF DESCRIPTION OF DRAWINGS

FIG. 3A and FIG. 3B are respectively schematic diagrams of application scenarios according to implementations of the present application.

FIG. 4 is a flowchart of an information configuration method according to an implementation.

FIG. 5 is a flowchart of an information configuration method according to an implementation.

FIG. 6 is a flowchart of an information configuration method according to an implementation.

FIG. 7 is a flowchart of an information configuration method according to an implementation.

FIG. 8 is a flowchart of an information configuration method according to an implementation.

FIG. 9 is a flowchart of an information configuration method according to an implementation.

FIG. 10 is a flowchart of an information configuration method according to an implementation.

FIG. 11 is a flowchart of an information configuration method according to an implementation.

FIG. 12 is a flowchart of an information configuration method according to an implementation.

FIG. 13 is a flowchart of an information configuration method according to an implementation.

FIG. 14 is a flowchart of an information configuration method according to an implementation.

FIG. 15 is a block diagram of an information configuration apparatus according to an implementation.

FIG. 16 is a block diagram of an information configuration apparatus according to an implementation.

Figure 17:
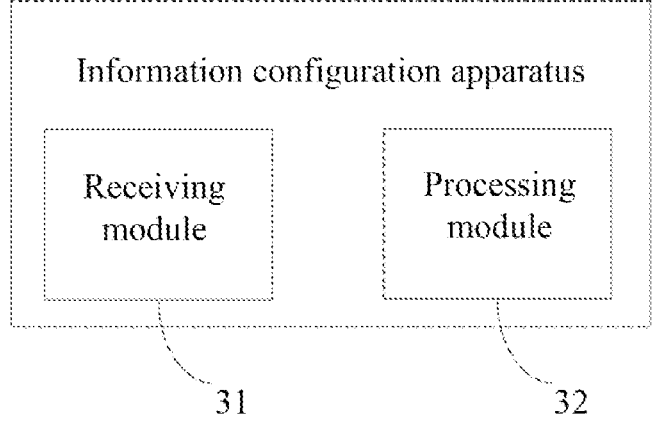

FIG. 17 is a block diagram of an information configuration apparatus according to an implementation.

Figure 18:
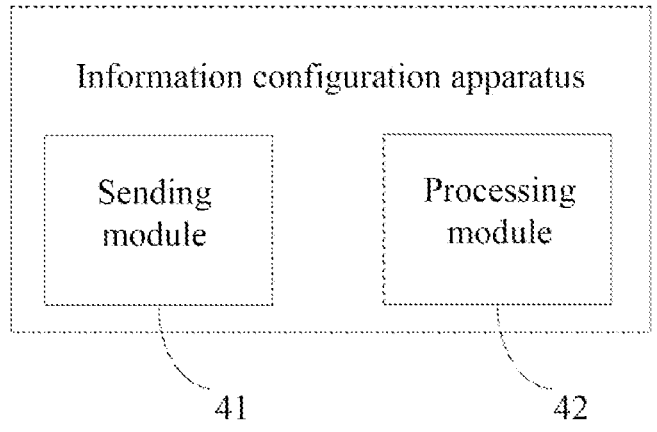

FIG. 18 is a block diagram of an information configuration apparatus according to an implementation.

Figure 19:
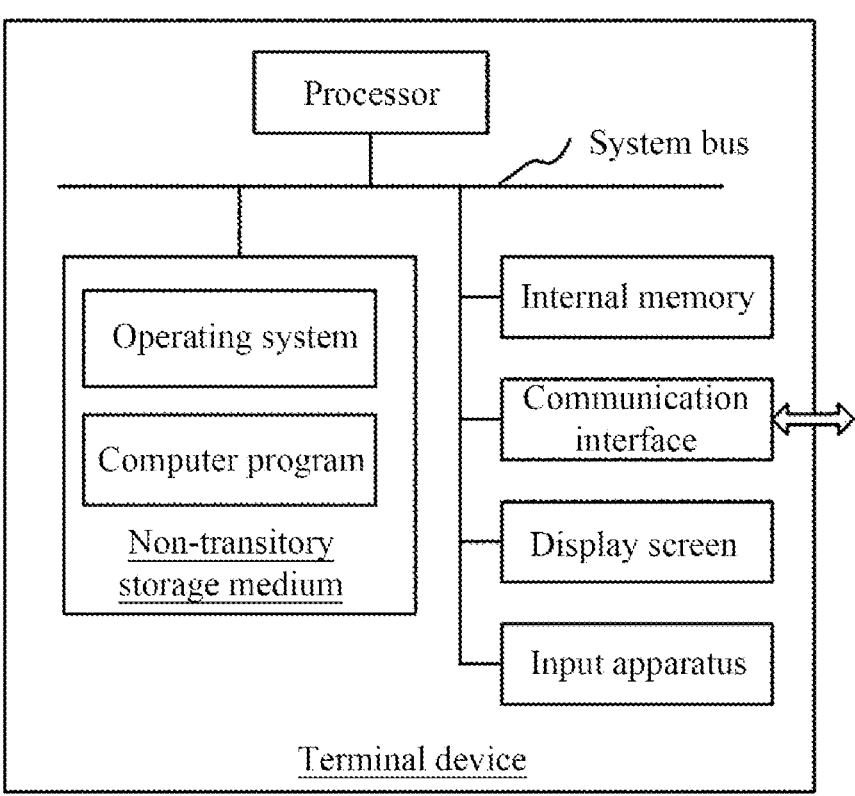

FIG. 19 is a schematic diagram of the internal structure of an electronic device according to an implementation.

Figure 20:
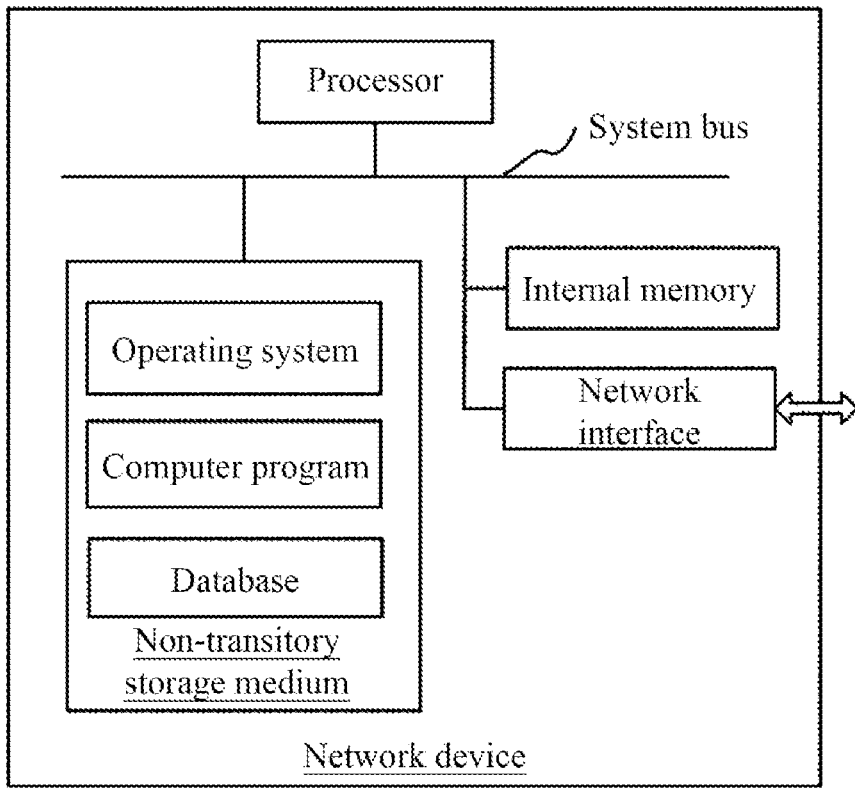

FIG. 20 is a schematic diagram of the internal structure of a network device according to an implementation.

DETAILED DESCRIPTION

For better understanding of the objects, technical solutions, and advantages of the present application, the present application will be described in further detail below in conjunction with the drawings and implementations. It should be understood that the implementations described herein are intended to explain the present application only, but are not intended to limit the present application.

The information configuration method according to the implementation of the present application may be applied to scenarios such as D2D or V2X, and D2D and V2X are described below.

Two transmission modes of Long Term Evolution (LTE) D2D are defined in the $3^{rd}$ Generation Partnership Project (3GPP): mode A and mode B.

In the mode A, a transmission resource of a terminal is allocated by a base station, and the terminal transmits data on a side link according to resource allocated by the base station; the base station may allocate to the terminal a resource for one-time transmission or allocate to the terminal a resource for semi-static transmission.

In the mode B, a terminal selects one resource in a resource pool for data transmission.

In the 3GPP, D2D is studied in different stages.

Proximity based service (ProSe): in Release 12/13 (Rel-12/13), D2D communication has been studied for a ProSe scenario, and is mainly aimed at public safety services. In the ProSe, by configuring a position of a resource pool in a time domain, for example, the resource pool is discontinuous in the time domain, so that a UE may transmit/receive data discontinuously on a side link, thereby achieving an effect of saving power.

Vehicle-to-Everything (V2X): in Rel-14/15, a V2X system has been studied for a scenario of Vehicle to Vehicle communication, which is mainly for services of relatively high-speed mobile vehicle to vehicle and vehicle to person communication.

Further Enhancements to LTE Device to Device (FeD2D): in Rel-14, this scenario in which a FeD2D is accessed to a network through a mobile phone has been studied, which is mainly for a scenario of a low mobile speed and low power access. In the FeD2D, a conclusion of the 3GPP in a pre-research stage is that a base station may configure a Discontinuous Reception (DRX) parameter of a remote terminal through a relay terminal. However, since this subject has not further entered a standardization stage, there is no conclusion on specific details of how to perform a DRX configuration.

On a basis of LTE V2X, New Radio (NR) V2X is not limited to a broadcast scenario, but is further extended to unicast and multicast scenarios, and an application of V2X is studied in these scenarios.

Similar to LTE V2X, the above two resource authorization modes of mode A/B will also be defined for NR V2X. Furthermore, a user terminal may be in a mixed mode, that is, the mode A may be used for resource acquisition and the mode B may be used for resource acquisition at the same time. Unlike LTE V2X, in addition to Hybrid Automatic Repeat ReQuest (HARQ) retransmission without feedback and initiated by a UE, feedback-based HARQ retransmission is introduced in NR V2X, which is not limited to unicast communication, but also includes multicast communication.

In the above-mentioned various scenarios, for some scenarios, in order to reduce power consumption of a device, a power saving mechanism needs to be set, for example, to control a terminal to enter a sleep state in some specific time periods or specific states, or to achieve a purpose of reducing the power consumption by means of discontinuous reception/transmission. If the above mode A is used for resource scheduling and a base station performs resource scheduling, a process of data transmission is relatively simple for a terminal, that is, data transmission is performed according to resource scheduling issued by a network. However, if the above Mode B is used for resource scheduling, a terminal transmits data based on a resource sensed by a carrier. In these two modes, there may be a conflict between data reception and data transmission, or a conflict between a sleep state and an activation state of a terminal, etc., which may lead to a low data transmission efficiency or even data transmission failure.

The information configuration method according to the implementation of the present application may solve a technical problem of "a low data transmission efficiency or even data transmission failure caused by the above various conflict problems". It should be noted that the information reporting processing method of the present application is not limited to solving the above technical problem, but may also be used for solving other technical problems, and the present application is not limited to this.

Figures 1A, 1B, 2:
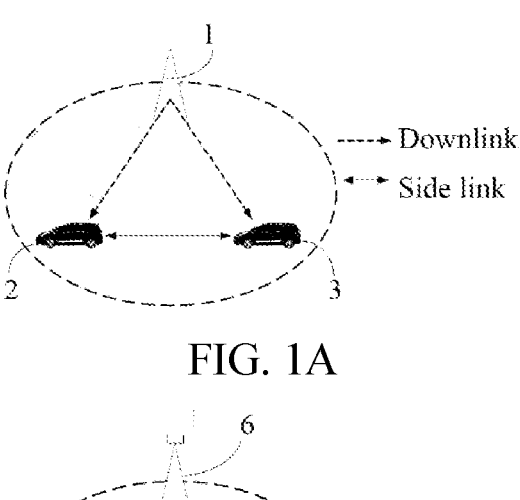
FIG. 1A and FIG. 1B are respectively schematic diagrams of scenarios of an information configuration method according to an implementation of the present application.
FIG. 2 is a flowchart of an information configuration method according to an implementation.

FIG. 1A and FIG. 1B are respectively schematic diagrams of scenarios of an information configuration method according to an implementation of the present application. As shown in FIG. 1A, a scenario includes network device 1, UE 2, and UE 3, in the scenario, mode A is used for resource scheduling, i.e. data transmission resources of UE 2 and UE 3 are uniformly scheduled by the network device 1. As shown in FIG. 1B, a scenario includes UE 4 and UE 5, in the scenario, mode B is used for resource scheduling, i.e. data transmission resources of UE 4 and UE 5 are acquired by a UE from a resource pool. Optionally, the scenario of FIG. 1B may also include a network device 6, but the network device 6 does not participate in resource scheduling of UE 4 and UE 5. The network device 1 and the network device 6 may be base stations, core network devices, etc., or may be achieved by independent base stations or a base station cluster composed of multiple base stations. The UE may be, but is not limited to, a variety of personal computers, laptops, smart phones, tablets, and portable wearable devices.

FIG. 2 is a flowchart of an information configuration method according to an implementation. As shown in FIG. 2, the method may include a following act S101.

In S101, a first UE receives configuration information sent by a second UE; and the configuration information is used for indicating a data transmission and reception related parameter under a power saving mechanism of a side link between the first UE and the second UE.

The configuration information is used for indicating the data transmission and reception related parameter under the power saving mechanism of the side link between the first UE and the second UE. The data transmission and reception related parameter may include a time location and/or frequency location of a transmission resource, a time length and/or frequency length of a transmission resource, a transmission period and the like required by the first UE and the second UE for data transmission and reception, for example, resource information and a transmission time period used by the first UE for sending data, resource information and a reception time period used by the first UE for receiving data, resource information and a transmission time period used by the second UE for sending data, and resource information and a reception time period used by the second UE for receiving data; and it may also include information such as sleep time intervals and activation time intervals of the first UE and the second UE. Content of the configuration information may be set according to actual needs, and is not limited in this implementation.

In this implementation, the configuration information may be acquired by the second UE from a network device, and may also be determined by the second UE itself. That is, the configuration information may be a data transmission and reception related parameter indicated by the network device under the power saving mechanism of the side link between the first UE and the second UE, or, the configuration information may be determined by the second UE according to its own data transmission and reception parameter and/or a data transmission and reception parameter of the first UE itself, and it is used for indicating a parameter suitable for data transmission and reception under the power saving mechanism of the side link.

The second UE may send configuration information to the first UE when its own data transmission and reception related parameter is changed; the second UE may send configuration information to the first UE when receiving its own data transmission and reception related parameter sent by the first UE; the second UE may send configuration information to the first UE when receiving configuration information sent by a network device; or the second UE may periodically send configuration information to the first UE, which is not limited in the implementation of the present application.

Optionally, the configuration information may be DRX configuration information, and the DRX configuration information is used for indicating a DRX data transmission and reception related parameter under the power saving mechanism of the side link between the first UE and the second UE, and the implementation of the present application is not limited thereto.

Optionally, the configuration information may include a period of signal transmission, duration of an activation period, an inactivity timer, a downlink Hybrid Automatic Repeat Request (HARQ) backhaul time timer, an uplink HARQ backhaul time timer, a downlink retransmission timer, and an uplink retransmission timer, etc. The implementation of the present disclosure is not limited thereto. The duration of the activation period is configured by an activation period timer (onDurationTimer). In addition, the inactivity timer is used for monitoring a Physical Downlink Control Channel (PDCCH) and is started when uplink data or downlink data is received; the downlink HARQ backhaul time timer is used for indicating the earliest time after which downlink retransmission of a HARQ process appears; the uplink HARQ backhaul time timer is used for indicating the earliest time after which uplink retransmission of a HARQ process appears; the downlink retransmission timer is used for limiting a maximum duration of a terminal device from start of the downlink retransmission timer until a downlink retransmission is received; and the uplink retransmission timer is used for limiting a maximum duration of a terminal device from start of the uplink retransmission timer until an uplink retransmission is received.

It should be noted that the first UE and the second UE in the implementation of the present application may be UE 2 or UE 3 in FIG. 1A, or may be UE 4 and UE 5 in FIG. 1B, for example, the first UE is UE 2 and the second UE is UE 3, or the first UE is UE 3 and the second UE is UE 2, or the first UE is UE 4 and the second UE is UE 5, or the first UE is UE 5 and the second UE is UE 4, which is not limited in the present application.

In the information configuration method according to the implementation of the present application, the first UE receives the configuration information sent by the second UE, since the configuration information is used for indicating the data transmission and reception related parameter under the power saving mechanism of the side link between the first UE and the second UE, when the first UE and the second UE communicate through the data transmission and reception related parameter indicated by the configuration information, a purpose of power saving may be achieved; and a purpose of the configuration information is to perform data transmission and reception under the power saving mechanism of the side link between the first UE and the second UE, then, under the power saving mechanism of the side link, when the first UE and the second UE perform data transmission and reception through the data transmission and reception related parameter indicated by the configuration information, there is no problem of a conflict between data reception and data transmission or a conflict between an active state and a sleep state of a terminal, thereby improving a data transmission efficiency and avoiding a problem of data transmission failure.

In the implementation shown in FIG. 2, when the above mode A is adopted for resource scheduling, or, when the second UE is covered by a network, the above configuration information may be information acquired by the second UE from a network device. For example, when the second UE needs to communicate with the first UE, the second UE may request the network device to acquire the configuration information, or when the second UE receives its own data transmission and reception related parameter sent by the first UE, it forwards its own data transmission and reception related parameter sent by the first UE to the network device, enabling the network device to feed back the configuration information; or, the second UE requests the configuration information from the network device when a data transmission and reception related parameter of the second UE itself is changed, which is not limited in the implementation of the present application. In the implementation, the configuration information is sent through the network device, that is, the network device uniformly schedules transmission resources, so as to ensure that the first UE and the second UE normally perform data transmission and reception under the power saving mechanism of the SL, avoid various conflicts, and improve a data transmission efficiency.

In other scenarios, the above configuration information may also be information determined by the second UE when the above mode B is used for resource scheduling, or when the second UE is not covered by the network. The second UE may acquire a transmission resource from a resource pool by means of sensing, and determine configuration information according to the transmission resource, the second UE may perform sensing in real time, and generate configuration information when a resource in the resource pool or a state of a resource is changed; or, the second UE performs sensing when its own transmission and reception data parameter is changed, and generates configuration information; or, the second UE may generate configuration information according to a data transmission and reception related parameter of the second UE itself and a data transmission and reception related parameter sent by the first UE when receiving the data transmission and reception related parameter sent by the first UE, which is not limited in the implementation of the present application. In the implementation of the present application, the second UE determines configuration information by itself, and even if there is no network device to schedule a resource, the first UE and the second UE may still perform data transmission and reception without conflict, which ensures reliability of data transmission and reception and can adapt to more scenarios.

In the implementation shown in FIG. 2, the first UE receives configuration information sent by the second UE, as shown in FIG. 1A or FIG. 1B, the first UE may be connected with a second UE, and the first UE receives configuration information sent by the second UE. It may be that the first UE may be connected with multiple second UEs. As shown in FIG. 3A, a first UE 301 is connected with a second UE 302, a second UE 303, and a second UE 304, respectively. The first UE may receive configuration information sent by multiple second UEs. Data transmission and reception related parameters indicated by configuration information sent by different second UEs may be the same, different, or partially the same, etc., which is not limited in the implementation of the present application. Or, it may be that multiple first UEs are connected with a same second UE, as shown in FIG. 3B, a first UE 306 and a first UE 307 are respectively connected with a second UE 308. Multiple first UEs may receive configuration information sent by a same second UE. For example, the second UE sends, in a form of broadcasting, a same piece of configuration information to the multiple first UEs connected with the second UE, or the second UE may respectively send corresponding configuration information for each first UE, and data transmission and reception related parameters indicated by the configuration information sent to different first UEs may be different, the same, or partially the same. The implementation of the present application is not limited thereto. Whether a first UE may receive configuration information sent by multiple second UEs or multiple first UEs receive configuration information sent by a same second UE, an acquisition mode of the configuration information, a data transmission and reception related parameter indicated by the configuration information, and the like, may refer to the implementation shown in FIG. 2, and will not be repeated here.

After the first UE receives configuration information sent by the second UE, the first UE may further give feedback aiming at the configuration information. As shown in FIG. 4, another information configuration method may include following acts S201-S202.

In S201, a first UE receives configuration information sent by a second UE; and the configuration information is used for indicating a data transmission and reception related parameter under a power saving mechanism of a side link between the first UE and the second UE.

An implementation principle of the act S201 may refer to the implementation shown in FIG. 2, and will not be repeated here.

In S202, the first UE sends a response message to the second UE; and the response message is used for indicating whether the first UE accepts the data transmission and reception related parameter indicated by the configuration information.

In the implementation, after the first UE receives the configuration information sent by the second UE, the first UE may feed back to the second UE that the configuration information has been received, and may also feed back whether the first UE accepts the data transmission and reception related parameter indicated by the configuration information. For example, if the response message indicates that the first UE accepts the data transmission and reception related parameter indicated by the configuration information, the first UE and the second UE may communicate through the data transmission and reception related parameter indicated by the configuration information. Or, the response message indicates that the first UE refuses to accept the data transmission and reception related parameter indicated by the configuration information, then the first UE and the second UE may also renegotiate a data transmission and reception related parameter, for example, the second UE re-determines some data transmission and reception related parameters and sends them to the first UE through new configuration information, or the second UE requests a network device to re-configure a new data transmission and reception related parameter, or the first UE directly informs the second UE of a modification opinion, etc., which is not limited in the implementation of the present application.

It should be noted that, in the implementation of the present application, a timing relationship between S201 and S202 is not limited to this, that is, the response message may be a response to the configuration information sent by the second UE and received by the first UE, and when the first UE is connected with multiple second UEs at the same time, the response message may also be a response to other second UEs.

In the information configuration method according to the implementation of the present application, the first UE sends the response message to the second UE, since the response message is used for indicating whether the first UE accepts the data transmission and reception related parameter indicated by the configuration information, in particular, when the first UE does not accept the data transmission and reception related parameter indicated by the configuration information, the second UE may know this situation in time, and reconfigure a data transmission and reception related parameter under a power saving mechanism of a side link between the first UE and the second UE to ensure reliability of data transmission and reception.

In the implementation, after the first UE receives the configuration information sent by the second UE, the first UE may further send a modification opinion aiming at the configuration information to the second UE. As shown in FIG. 5, another information configuration method may include following acts S301-S302.

In S301, a first UE receives configuration information sent by a second UE; and the configuration information is used for indicating a data transmission and reception related parameter under a power saving mechanism of a side link between the first UE and the second UE.

An implementation principle of the act S301 may refer to the implementation shown in FIG. 2, and will not be repeated here.

Optionally, the configuration information indicates at least one piece of following information: parameter information sent aiming at the first UE; parameter information received aiming at the first UE; parameter information received aiming at the second UE; and parameter information sent aiming at the second UE.

In this implementation, parameter information for sending data by various UEs or parameter information for receiving data by various UEs may be configured in the configuration information. For example, the parameter information sent aiming at the first UE or the parameter information sent aiming at the second UE may include a time-frequency resource location, a sending period, an amount of sent data, a sending mode, and the like used when sending data; the parameter information received aiming at the first UE or the parameter information received aiming at the second UE may include a time-frequency resource location, a reception period, an amount of received data, a reception mode, and the like used when receiving data, which is not limited in the implementation of the present application.

In S302, the first UE sends a feedback message to the second UE; and the feedback message includes modification information for the configuration information.

In the implementation, the first UE may also modify the configuration information, the first UE may send the modification information to the second UE, and the second UE may re-determine a data transmission and reception related parameter under a power saving mechanism of a side link between the first UE and the second UE indicated by the configuration information according to the modification information. The second UE may also send the modification information to a network device, and the network device re-determines a data transmission and reception related parameter under the power saving mechanism of the side link between the first UE and the second UE indicated by the configuration information. Optionally, after the second UE determines new configuration information, the new configuration information is sent to the first UE, and the new configuration information may indicate a data transmission and reception related parameter under the power saving mechanism of the side link between the first UE and the second UE updated according to the modification information.

In the information configuration method according to the implementation of the present application, the first UE may send the feedback message to the second UE to indicate modification information for the configuration information, when the first UE does not accept or does not completely receive the configuration information, the modification information is fed back to the second UE, and the second UE may re-determine a data transmission and reception related parameter under the power saving mechanism of the side link between the first UE and the second UE, so as to ensure that the new data transmission and reception related parameter may not only save power, but also avoid a conflict, and may be more adapted to performance of each UE.

In some scenarios, the first UE may also send its own data transmission and reception related parameter to the second UE. As shown in FIG. 6, the method may include a following act S401.

In S401, a first UE sends parameter information to a second UE; and the parameter information indicates a related parameter of data transmission and reception performed by the first UE aiming at the second UE.

The parameter information is a related parameter of data transmission and reception performed by the first UE aiming at the second UE, for example, the parameter information may include a time period, a carrier location, a symbol location, a sending port, and the like when the first UE performs data transmission aiming at the second UE; and the parameter information may also include a time period, a carrier location, a symbol location, a receiving port, and the like when the first UE performs data reception aiming at the second UE, which is not limited in the implementation of the present application.

In the implementation of that present application, the first UE may send parameter information to the second UE when the first UE needs to communicate with the second UE, the first UE may send parameter information to the second UE when its own data transmission and reception related parameter is changed, the first UE may send parameter information to the second UE when it is started, or may send parameter information to the second UE when it receives configuration information and does not accept the configuration information, etc., which is not limited in the implementation of the present application.

In the implementation, as shown in FIG. 1A or FIG. 1B, the first UE may be connected with a second UE, and the first UE sends parameter information to the second UE. It may be that the first UE may be connected with multiple second UEs. As shown in FIG. 3A, a first UE 301 is connected with a second UE 302, a second UE 303, and a second UE 304, respectively, and the first UE may send parameter information to multiple second UEs. Optionally, it may be that multiple first UEs are connected with a same second UE. As shown in FIG. 3B, a first UE 306 and a first UE 307 are respectively connected with a second UE 308. All the first UEs may send parameters to the same second UE, and contents of parameter information sent by different first UEs may be different, the same, or partially the same. The implementation of the present application is not limited thereto. Whether a first UE sends parameter information to multiple second UEs or multiple first UEs send parameter information to a same second UE, an acquisition mode, an indicated related parameter, and the like of the parameter information may refer to the implementation shown in FIG. 6, and will not be repeated here.

In the information configuration method according to the implementation of the present application, the first UE sends the parameter information to the second UE. Since the parameter information indicates the related parameter of data transmission and reception performed by the first UE aiming at the second UE, the second UE may obtain the related parameter of data transmission and reception of the first UE, thereby avoiding occurrence of various conflicts and ensuring data transmission quality when the second UE performs data transmission and reception with the first UE under a power saving mechanism of an SL.

Optionally, after the first UE sends the parameter information to the second UE, the second UE may determine configuration information according to a related parameter of data transmission and reception performed by the first UE aiming at the second UE indicated by the parameter information and a related parameter of data transmission and reception of the second UE itself. Or the second UE may report the parameter information to a network device, and the network device determines configuration information.

In the implementation, optionally, the parameter information indicates information of data transmission performed by the first UE and/or information of data reception performed by the first UE. Further, the information of data transmission performed by the first UE includes a transmission related parameter configured by the network device for the first UE or a related parameter sensed by the first UE for data transmission.

In the implementation, when the mode A is adopted for resource scheduling, the network device configures a transmission related parameter for the first UE, for example, the transmission related parameter configured by the network device for the first UE includes: a related parameter of a Uu interface configured by the network device for the first UE; and/or resource grant information configured by the network device for the first UE. When the mode B is adopted or the first UE is not covered by a network, the first UE senses a related parameter for data transmission, for example, the related parameter sensed by the first UE for data transmission includes at least one of a period of sensing, a time offset of sensing, time location information of a sensing resource, and information of a quantity of sensing resources. For different modes, the information of data transmission performed by the first UE may be obtained in different ways, which may be flexibly applied to different scenarios to improve universality of scenarios.

In one implementation, the information of data reception performed by the first UE includes at least one of a period, a time offset, and a timer length. The information of data reception performed by the first UE may further include receiving port information, an amount of received data, a receiving mode, and the like, which is not limited in the implementation of the present application.

In implementations shown in FIG. 2 to FIG. 6, an information configuration method according to an implementation of the present application is mainly described by taking the first UE receiving configuration information as an example. Hereinafter, an information configuration method according to an implementation of the present application is mainly described by taking the first UE sending configuration information as an example.

FIG. 7 is a flowchart of an information configuration method according to an implementation. As shown in FIG. 7, the method may include a following act S501.

In S501, a first UE sends configuration information to a second UE; and the configuration information is used for indicating a data transmission and reception related parameter under a power saving mechanism of a side link between the first UE and the second UE.

The configuration information is used for indicating the data transmission and reception related parameter under the power saving mechanism of the side link between the first UE and the second UE. The data transmission and reception related parameter may include a time location and/or frequency location of a transmission resource, a time length and/or frequency length of a transmission resource, a transmission period, and the like required by the first UE and the second UE for data transmission and reception, for example, resource information and a transmission time period used by the first UE for sending data, resource information and a reception time period used by the first UE for receiving data, resource information and a transmission time period used by the second UE for sending data, and resource information and a reception time period used by the second UE for receiving data; and it may also include information such as sleep time intervals and activation time intervals of the first UE and the second UE. Content of the configuration information may be set according to actual needs, and is not limited in this implementation.

In this implementation, the configuration information may be acquired by the first UE from a network device, and may also be determined by the first UE itself. That is, the configuration information may be a data transmission and reception related parameter indicated by the network device under the power saving mechanism of the side link between the first UE and the second UE, or, the configuration information may be determined by the first UE according to its own data transmission and reception parameter and/or a data transmission and reception parameter of the second UE itself, and it is used for indicating a parameter suitable for data transmission and reception under the power saving mechanism of the side link.

The first UE may send configuration information to the second UE when its own data transmission and reception related parameter is changed; the first UE may send configuration information to the second UE when receiving its own data transmission and reception related parameter sent by the second UE; the first UE may send configuration information to the second UE when receiving configuration information sent by a network device; or the first UE may periodically send configuration information to the second UE, which is not limited in the implementation of the present application.

Optionally, the configuration information may be DRX configuration information, and the DRX configuration information is used for indicating a DRX data transmission and reception related parameter under the power saving mechanism of the side link between the first UE and the second UE, and the implementation of the present application is not limited thereto.

Optionally, the configuration information may include a period of signal transmission, duration of an activation period, an inactivity timer, a downlink Hybrid Automatic Repeat Request (HARQ) backhaul time timer, an uplink HARQ backhaul time timer, a downlink retransmission timer, an uplink retransmission timer, etc. The implementation of the present disclosure is not limited thereto. The duration of the activation period is configured by an activation period timer (onDurationTimer). In addition, the inactivity timer is used for monitoring a Physical Downlink Control Channel (PDCCH) and is started when uplink data or downlink data is received; the downlink HARQ backhaul time timer is used for indicating the earliest time after which downlink retransmission of a HARQ process appears; the uplink HARQ backhaul time timer is used for indicating the earliest time after which uplink retransmission of a HARQ process appears; the downlink retransmission timer is used for limiting a maximum duration of a terminal device from start of the downlink retransmission timer until a downlink retransmission is received; and the uplink retransmission timer is used for limiting a maximum duration of a terminal device from start of the uplink retransmission timer until an uplink retransmission is received.

It should be noted that the first UE and the second UE in the implementation of the present application may be UE 2 or UE 3 in FIG. 1A, or may be UE 4 and UE 5 in FIG. 1B, for example, the first UE is UE 2 and the second UE is UE 3, or the first UE is UE 3 and the second UE is UE 2, or the first UE is UE 4 and the second UE is UE 5, or the first UE is UE 5 and the second UE is UE 4, which is not limited in the present application.

In the information configuration method according to the implementation of the present application, the first UE sends configuration information to the second UE, since the configuration information is used for indicating the data transmission and reception related parameter under the power saving mechanism of the side link between the first UE and the second UE, when the first UE and the second UE communicate through the data transmission and reception related parameter indicated by the configuration information, a purpose of power saving may be achieved; and a purpose of the configuration information is to perform data transmission and reception under the power saving mechanism of the side link between the first UE and the second UE, then, under the power saving mechanism of the side link, when the first UE and the second UE perform data transmission and reception through the data transmission and reception related parameter indicated by the configuration information, there is no problem of a conflict between data reception and data transmission or a conflict between an active state and a sleep state of a terminal, thereby improving a data transmission efficiency and avoiding a problem of data transmission failure.

Based on the implementation shown in FIG. 7, the first UE may be connected with a second UE, and the first UE sends configuration information to the second UE. It may be that the first UE may be connected with multiple second UEs. As shown in FIG. 3A, a first UE 301 is connected with a second UE 302, a second UE 303, and a second UE 304, respectively, and the first UE may send configuration information to multiple second UEs. Optionally, it may be that multiple first UEs are connected with a same second UE. As shown in FIG. 3B, a first UE 306 and a first UE 307 are respectively connected with a second UE 308, and all the first UEs may send configuration information to the same second UE. Whether the configuration information sent by the first UE to multiple second UEs or the configuration information sent by multiple first UEs to the same second UE, an acquisition mode of the configuration information, a data transmission and reception related parameter indicated by the configuration information, and the like, may refer to the implementation shown in FIG. 2, and will not be repeated here.

In one implementation, when the above mode A is adopted for resource scheduling, or, when the first UE is covered by a network, the above configuration information may be information acquired by the first UE from a network device. For example, when the first UE needs to communicate with the second UE, the first UE may request the network device to acquire the configuration information, or when the second UE receives its own data transmission and reception related parameter sent by the first UE, it forwards its own data transmission and reception related parameter sent by the first UE to the network device, so that the network device feeds back the configuration information; or, the first UE requests the configuration information from the network device when a data transmission and reception related parameter of the first UE itself is changed, which is not limited in the implementation of the present application. In the implementation, the configuration information is sent through the network device, that is, the network device uniformly schedules transmission resources, so as to ensure that the first UE and the second UE normally perform data transmission and reception under the power saving mechanism of the SL, avoid various conflicts, and improve a data transmission efficiency.

In other scenarios, the above configuration information may also be information determined by the first UE when the above mode B is used for resource scheduling, or when the first UE is not covered by the network. The first UE may acquire a transmission resource from a resource pool by means of sensing, and determine configuration information according to the transmission resource, the first UE may perform sensing in real time, and generate configuration information when a resource in the resource pool or a state of a resource is changed; or, the first UE performs sensing when its own transmission and reception data parameter is changed, and generates configuration information; or, the first UE may generate configuration information according to a data transmission and reception related parameter of the first UE itself and a data transmission and reception related parameter sent by the second UE when receiving the data transmission and reception related parameter sent by the second UE, which is not limited in the implementation of the present application. In the implementation of the present application, the first UE determines configuration information by itself, and even if there is no network device to schedule a resource, the first UE and the second UE may still perform data transmission and reception without conflict, which ensures reliability of data transmission and reception and can adapt to more scenarios.

After the first UE sends configuration information to the second UE, the second UE may further give feedback aiming at the configuration information. As shown in FIG. 8, another information configuration method may include following acts S601-S602.

In S601, a first UE sends configuration information to a second UE; and the configuration information is used for indicating a data transmission and reception related parameter under a power saving mechanism of a side link between the first UE and the second UE.

In S602, the first UE receives a response message sent by the second UE; and the response message is used for indicating whether the second UE accepts the data transmission and reception related parameter indicated by the configuration information.

An implementation principle of the implementation of the present application may refer to an implementation principle of the implementation of FIG. 4 and will not be repeated herein.

In the information configuration method according to the implementation of the present application, the first UE receives the response message sent by the second UE, the response message is used for indicating whether the second UE accepts the data transmission and reception related parameter indicated by the configuration information, in particular, when the second UE does not accept the data transmission and reception related parameter indicated by the configuration information, the first UE may know this situation in time, and reconfigure a data transmission and reception related parameter under a power saving mechanism of a side link between the first UE and the second UE to ensure reliability of data transmission and reception.

In the implementation, after the first UE sends the configuration information to the second UE, the second UE may further send a modification opinion aiming at the configuration information to the first UE. As shown in FIG. 9, another information configuration method may include following acts S701-S702.

In S701, a first UE sends configuration information to a second UE; and the configuration information is used for indicating a data transmission and reception related parameter under a power saving mechanism of a side link between the first UE and the second UE.

Optionally, the configuration information indicates at least one piece of following information: parameter information sent aiming at the first UE; parameter information received aiming at the first UE; parameter information received aiming at the second UE; and parameter information sent aiming at the second UE.

In S702, the first UE receives a feedback message sent by the second UE; and the feedback message includes modification information for the configuration information.

An implementation principle of the implementation of the present application may refer to an implementation principle of the implementation of FIG. 5 and will not be repeated herein.

In the information configuration method according to the implementation of the present application, the first UE receives the feedback message sent by the second UE to indicate modification information for the configuration information, when the second UE does not accept or does not completely receive the configuration information, the modification information is fed back to the first UE, and the first UE may re-determine a data transmission and reception related parameter under the power saving mechanism of the side link between the first UE and the second UE, so as to ensure that the new data transmission and reception related parameter may not only save power, but also avoid a conflict, and may be more adapted to performance of each UE.

In some scenarios, the second UE may further send its own data transmission and reception related parameter to the first UE. As shown in FIG. 10, the method may include a following act S801.

In S801, a first UE receives parameter information sent by a second UE; and the parameter information indicates a related parameter of data transmission and reception performed by the second UE aiming at the first UE.

An implementation principle of the implementation of the present application may refer to an implementation principle of the implementation of FIG. 6 and will not be repeated herein.

In the implementation, the first UE receives parameter information sent by the second UE, as shown in FIG. 1A or FIG. 1B, the first UE may be connected with a second UE, and the first UE receives parameter information sent by the second UE. It may be that the first UE may be connected with multiple second UEs. As shown in FIG. 3A, a first UE 301 is connected with a second UE 302, a second UE 303, and a second UE 304, respectively. The first UE may receive parameter information sent by multiple second UEs. Contents of parameter information sent by different second UEs may be the same, different, or partially the same, etc., which is not limited in the implementation of the present application. Or, it may be that multiple first UEs are connected with a same second UE, as shown in FIG. 3B, a first UE 306 and a first UE 307 are respectively connected with a second UE 308. Multiple first UEs may receive parameter information sent by a same second UE. For example, the second UE sends, in a form of broadcasting, a same piece of parameter information to the multiple first UEs connected with the second UE, or the second UE may respectively send corresponding parameter information for each first UE, and contents of parameter information sent to different first UEs may be different, the same, or partially the same. The implementation of the present application is not limited thereto. Whether a first UE may receive parameter information sent by multiple second UEs or multiple first UEs receive parameter information sent by a same second UE, an acquisition mode of the parameter information, a data transmission and reception related parameter indicated by the parameter information, and the like, may refer to the implementation shown in FIG. 6, and will not be repeated here.

In the information configuration method according to the implementation of the present application, the first UE receives parameter information sent by the second UE. The parameter information indicates the related parameter of data transmission and reception performed by the second UE aiming at the first UE, enabling the first UE to obtain the related parameter of data transmission and reception of the second UE, thereby avoiding occurrence of various conflicts and ensuring data transmission quality when the first UE performs data transmission and reception with the second UE under a power saving mechanism of an SL.

Optionally, after the first UE receives the parameter information sent by the second UE, the first UE may determine configuration information according to a related parameter of data transmission and reception performed by the second UE indicated by the parameter information and a related parameter of data transmission and reception of the first UE itself. Or the first UE may report the parameter information to a network device, and the network device determines configuration information.

In one of the implementations, the parameter information indicates information of data transmission performed by the second UE and/or information of data reception performed by the second UE.

In one of the implementations, the information of data transmission performed by the second UE includes a transmission related parameter configured by the network device for the second UE or a related parameter for data transmission sensed by the second UE.

In one of the implementations, the transmission related parameter configured by the network device for the second UE includes: a related parameter of a Uu interface configured by the network device for the second UE; and/or resource grant information configured by the network device for the second UE.

In one of the implementations, the related parameter sensed by the second UE for data transmission includes at least one of a period of sensing, a time offset of sensing, time location information of a sensing resource, and information of a quantity of sensing resources.

In one of the implementations, the information of data reception performed by the second UE includes at least one of a period, a time offset, and a timer length.

An implementation principle and a beneficial effect of relevant parameter information described above may be referred to an implementation principle and a beneficial effect of parameter information in the foregoing implementations and will not be repeated here.

In the implementations shown in FIG. 2 to FIG. 10, an interaction process between two UEs is mainly introduced. Hereinafter, an information configuration method according to an implementation of the present application is introduced in detail by mainly taking interaction between a UE and a network device as an example.

FIG. 11 is a flowchart of an information configuration method according to an implementation, and the method relates to a specific implementation process of a UE receiving configuration information sent by a network device. As shown in FIG. 11, the method may include a following act S901.

In S901, a first UE receives configuration information sent by a network device; and the configuration information is used for indicating a data transmission and reception related parameter under a power saving mechanism of a side link between the first UE and a second UE.

The configuration information is used for indicating the data transmission and reception related parameter under the power saving mechanism of the side link between the first UE and the second UE. The data transmission and reception related parameter may include a time location and/or frequency position of a transmission resource, a time length and/or frequency length of a transmission resource, a transmission period, and the like required by the first UE and the second UE for data transmission and reception, for example, resource information and a transmission time period used by the first UE for sending data, resource information and a reception time period used by the first UE for receiving data, resource information and a transmission time period used by the second UE for sending data, and resource information and a reception time period used by the second UE for receiving data; and it may also include information such as sleep time intervals and activation time intervals of the first UE and the second UE. Content of the configuration information may be set according to actual needs, and is not limited in this implementation.

The network device may send configuration information to the first UE after receiving parameter information sent by the first UE to the network device, or the network device may send configuration information to the first UE when data transmission and reception related parameters of the first UE and/or the second UE themselves are updated, or the network device may periodically send configuration information to the first UE, which is not limited in the implementation of the present application.

Optionally, the configuration information may be DRX configuration information, and the DRX configuration information is used for indicating a DRX data transmission and reception related parameter under the power saving mechanism of the side link between the first UE and the second UE, and the implementation of the present application is not limited thereto.

Optionally, the configuration information may include a period of DRX, duration of an activation period, an inactivity timer, a downlink Hybrid Automatic Repeat Request (HARQ) backhaul time timer, an uplink HARQ backhaul time timer, a downlink retransmission timer, an uplink retransmission timer, etc. The implementation of the present disclosure is not limited thereto. The duration of the activation period is configured by an activation period timer (onDurationTimer). In addition, the inactivity timer is used for monitoring a Physical Downlink Control Channel (PDCCH) and is started when uplink data or downlink data is received; the downlink HARQ backhaul time timer is used for indicating the earliest time after which downlink retransmission of a HARQ process appears; the uplink HARQ backhaul time timer is used for indicating the earliest time after which uplink retransmission of a HARQ process appears; the downlink retransmission timer is used for limiting a maximum duration of a terminal device from start of the downlink retransmission timer until a downlink retransmission is received; and the uplink retransmission timer is used for limiting a maximum duration of a terminal device from start of the uplink retransmission timer until an uplink retransmission is received.

It should be noted that the first UE and the second UE in the implementation of the present application may be UE 2 or UE 3 in FIG. 1A, or may be UE 4 and UE 5 in FIG. 1B, for example, the first UE is UE 2 and the second UE is UE 3, or the first UE is UE 3 and the second UE is UE 2, or the first UE is UE 4 and the second UE is UE 5, or the first UE is UE 5 and the second UE is UE 4, and the network device may be the network device shown in FIG. 1A or FIG. 1B, which is not limited in the present application.

In the information configuration method according to the implementation of the present application, the first UE receives the configuration information sent by the network device, since the configuration information is used for indicating the data transmission and reception related parameter under the power saving mechanism of the side link between the first UE and the second UE, when the first UE and the second UE communicate through the data transmission and reception related parameter indicated by the configuration information, a purpose of power saving may be achieved; and a purpose of the configuration information is to perform data transmission and reception under the power saving mechanism of the side link between the first UE and the second UE, then, under the power saving mechanism of the side link, when the first UE and the second UE perform data transmission and reception through the data transmission and reception related parameter indicated by the configuration information, there is no problem of a conflict between data reception and data transmission or a conflict between an active state and a sleep state of a terminal, thereby improving a data transmission efficiency and avoiding a problem of data transmission failure.

FIG. 12 is a flowchart of an information configuration method according to an implementation. As shown in FIG. 12, the method may further include a following act S1001.

In S1001, a first UE sends parameter information to a network device; and the parameter information indicates a related parameter of data transmission and reception performed by a second UE aiming at the first UE.

The parameter information indicates the related parameter of data transmission and reception performed by the second UE aiming at the first UE, for example, the parameter information may include a time period, a carrier location, a symbol location, a sending port, and the like when the second UE performs data transmission aiming at the first UE; and the parameter information may also include a time period, a carrier location, a symbol location, a receiving port, and the like when the second UE performs data reception aiming at the first UE, which is not limited in the implementation of the present application.

In the implementation of the present application, after the first UE receives parameter information sent by the second UE, the first UE transfers the parameter information to the network device, or the first UE may transfer the parameter information to the network device when its own data transmission and reception related parameter is changed, which is not limited in the implementation of the present application.

In the information configuration method according to the implementation of the present application, the first UE sends parameter information to the network device; the parameter information indicates the related parameter of data transmission and reception performed by the second UE aiming at the first UE, so that the network device can obtain the related parameter of data transmission and reception of the second UE, and then prepare to configure a related parameter of data transmission and reception performed by the second UE with the first UE under a power saving mechanism of an SL, avoiding occurrence of various conflicts and ensuring data transmission quality.

FIG. 13 is a flowchart of an information configuration method according to an implementation, and the method relates to a specific implementation process of sending configuration information to a UE by a network device. As shown in FIG. 13, the method may include a following act S1101.

In S1101, a network device sends configuration information to a first UE; and the configuration information is used for indicating a data transmission and reception related parameter under a power saving mechanism of a side link between the first UE and a second UE.

An implementation principle of the implementation of the present application may refer to the implementation of FIG. 11 and will not be repeated herein.

In the information configuration method according to the implementation of the present application, the network device sends configuration information to the first UE, since the configuration information is used for indicating the data transmission and reception related parameter under the power saving mechanism of the side link between the first UE and the second UE, when the first UE and the second UE communicate through the data transmission and reception related parameter indicated by the configuration information, a purpose of power saving may be achieved; and a purpose of the configuration information is to perform data transmission and reception under the power saving mechanism of the side link between the first UE and the second UE, then, under the power saving mechanism of the side link, when the first UE and the second UE perform data transmission and reception through the data transmission and reception related parameter indicated by the configuration information, there is no problem of a conflict between data reception and data transmission or a conflict between an active state and a sleep state of a terminal, thereby improving a data transmission efficiency and avoiding a problem of data transmission failure.

FIG. 14 is a flowchart of an information configuration method according to an implementation. As shown in FIG. 14, the method may further include a following act S1201.

In S1201, a network device receives parameter information sent by a first UE; and the parameter information indicates a related parameter of data transmission and reception performed by a second UE aiming at the first UE.

An implementation principle of the implementation of the present application may refer to the implementation of FIG. 12 and will not be repeated herein.

In the information configuration method according to the implementation of the present application, the network device receives parameter information sent by the first UE; the parameter information indicates the related parameter of data transmission and reception performed by the second UE aiming at the first UE, enabling the network device to obtain the related parameter of data transmission and reception of the second UE, and then prepare to configure a related parameter of data transmission and reception performed by the second UE with the first UE under a power saving mechanism of an SL, avoiding occurrence of various conflicts and ensuring data transmission quality.

In any of implementations of FIG. 11 to FIG. 14, the parameter information indicates information of data transmission performed by the second UE and/or information of data reception performed by the second UE.

In any of implementations of FIG. 11 to FIG. 14, the information of data transmission performed by the second UE includes a parameter configured by the network device for the second UE or a parameter sensed by the second UE.

In any of implementations of FIG. 11 to FIG. 14, the parameter configured by the network device for the second UE includes: a related parameter of a Uu interface configured by the network device for the second UE; and/or, resource grant information configured by the network device for the second UE.

In any of implementations of FIG. 11 to FIG. 14, the parameter sensed by the second UE includes at least one of a period of sensing, a time offset of sensing, time location information of a sensing resource, and information of a quantity of sensing resources.

In any of implementations of FIG. 11 to FIG. 14, the information of data reception performed by the second UE includes at least one of a period, a time offset, and a timer length.

In any of implementations of FIG. 11 to FIG. 14, the configuration information indicates at least one piece of following information: parameter information sent aiming at the first UE; parameter information received aiming at the first UE; parameter information received aiming at the second UE; and parameter information sent aiming at the second UE.

Implementation principles and beneficial effects of relevant parameter information and configuration information described above may be referred to introduction in implementations of FIG. 2 to FIG. 10, and will not be repeated here.

It should be understood that although the acts in the flow charts of FIG. 2 to FIG. 14 are shown in sequence as indicated by arrows, these acts are not necessarily performed in the order indicated by the arrows. Unless explicitly stated herein, the order of performing these acts is not strictly limited, and these acts may be performed in other orders. Moreover, at least a part of the acts in FIG. 2 to FIG. 14 may include multiple sub-acts or multiple stages, which may not be necessarily completed at the same time, but may be performed at different time points. These sub-acts or stages may not necessarily be performed in sequence, but may be performed in turn or alternately with other acts or at least a part of the sub-acts or stages of the other acts.

In an implementation, as shown in FIG. 15, there is provided an information configuration apparatus, which includes a receiving module 11 and a processing module 12.

The processing module 12 is used to receive configuration information sent by a second UE through the receiving module 11; and the configuration information is used for indicating a data transmission and reception related parameter under a power saving mechanism of a side link between a first UE and the second UE.

In one implementation, the apparatus further includes:
a sending module, used to send parameter information to the second UE; wherein the parameter information indicates a related parameter of data transmission and reception performed by the first UE aiming at the second UE.

In an implementation, as shown in FIG. 16, there is provided an information configuration apparatus, which includes a sending module 21 and a processing module 22.

The processing module 22 is used to send configuration information to a second UE through the sending module 21; and the configuration information is used for indicating a data transmission and reception related parameter under a power saving mechanism of a side link between a first UE and the second UE.

In one implementation, the apparatus further includes: a receiving module, used to receive parameter information sent by the second UE; wherein the parameter information indicates a related parameter of data transmission and reception performed by the second UE aiming at the first UE.

In an implementation, as shown in FIG. 17, there is provided an information configuration apparatus, which includes a receiving module 31 and a processing module 32.

The processing module 32 is used to receive configuration information sent by a network device through the receiving module 31; and the configuration information is used for indicating a data transmission and reception related parameter under a power saving mechanism of a side link between a first UE and a second UE.

In one implementation, the apparatus further includes: a sending module, used to send parameter information to the network device; wherein the parameter information indicates a related parameter of data transmission and reception performed by the second UE aiming at the first UE.

In an implementation, as shown in FIG. 18, there is provided an information configuration apparatus, which includes a sending module 41 and a processing module 42.

The processing module 42 is used to send configuration information to a first UE through the sending module 41; and the configuration information is used for indicating a data transmission and reception related parameter under a power saving mechanism of a side link between the first UE and a second UE.

In one implementation, the apparatus further includes: a receiving module, used to receive related information sent by the first UE; wherein the parameter information indicates a related parameter of data transmission and reception performed by the second UE aiming at the first UE.

Implementation principles and technical effects of information configuration apparatuses according to the above-mentioned implementations are similar to those of the above-mentioned method implementations, and will not be repeated here.

Specific limitations of the information configuration apparatuses may refer to limitations of the information configuration methods described above, and will not be repeated here. Various modules in the information configuration apparatuses may be implemented in whole or in part through software, hardware, and combinations thereof. The various modules may be embedded in, or independent of, a processor in a computer device in the form of hardware, or may be stored in a memory in a computer device in the form of software, for the processor to invoke and execute operations corresponding to the various modules.

In an implementation, an electronic device is provided. The electronic device may be a terminal, and a diagram of its internal structure may be as shown in FIG. 19. The electronic device includes a processor, a memory, a communication interface, a display screen, and an input apparatus which are connected through a system bus. The processor of the electronic device is used to provide computing and control capabilities. The memory of the electronic device includes a non-transitory storage medium and an internal memory. The non-transitory storage medium stores an operating system and a computer program. The internal memory provides an environment for running the operating system and the computer program in the non-transitory storage medium. The communication interface of the electronic device is used to communicate with external terminals in a wired or wireless manner, and the wireless manner may be achieved through Wireless Fidelity (WIFI), an operator network, Near Field Communication (NFC), or another technology. When the computer program is executed by a processor, an information configuration method is implemented. The display screen of the electronic device may be a liquid crystal display screen or an electronic ink display screen. The input apparatus of the electronic device may be a touch layer covering on the display screen, or may be keys, a trackball, or a touch pad provided on a housing of the electronic device, or may be an external keyboard, a touch pad, or a mouse, etc.

In one implementation, a network device is provided. The network device may be a server, and a diagram of its internal structure may be as shown in FIG. 20. The network device includes a processor, a memory, and a network interface which are connected through a system bus. The processor of the network device is used to provide computing and control capabilities. The memory of the network device includes a non-transitory storage medium and an internal memory. An operating system, a computer program and a database are stored in the non-transitory storage medium. The internal memory provides an environment for running the operating system and the computer program in the non-transitory storage medium. The database of the network device is used to store information configuration data. The network interface of the network device is used to communicate with an external terminal through a network connection. When the computer program is executed by the processor, an information configuration method is implemented.

In an implementation, there is provided a terminal device including a processor, a memory, and a transceiver, wherein the processor, the memory, and the transceiver communicate with each other through an internal connection path.

The memory is used to store program codes.

The processor is used to invoke program codes stored in the memory to cooperate with the transceiver to implement acts of any one of methods of FIG. 2 to FIG. 10.

In an implementation, there is provided a terminal device including a processor, a memory, and a transceiver, wherein the processor, the memory, and the transceiver communicate with each other through an internal connection path.

The memory is used to store program codes.

The processor is used to invoke program codes stored in the memory to cooperate with the transceiver to implement acts of any one of methods of FIG. 11 to FIG. 12.

In an implementation, there is provided a network device including a processor, a memory, and a transceiver, wherein the processor, the memory, and the transceiver communicate with each other through an internal connection path.

The memory is used to store program codes.

The processor is used to invoke program codes stored in the memory to cooperate with the transceiver to implement acts of any one of methods of FIG. 13 to FIG. 14.

An implementation principle and technical effects of a terminal device or a network device according to the above-mentioned implementations are similar to those of the above method implementations, and will not be repeated here.

An implementation of the present application further provides a computer readable storage medium. When computer executable instructions are executed by one or more processors, one or more non-transitory computer readable storage media containing the computer executable instructions enable the processors to perform acts of the information configuration method.

An implementation principle and technical effects of the computer readable storage medium according to the above implementation are similar to those of the above method implementations, and will not be repeated here.

Those of ordinary skill in the art may understand that all or part of processes in methods of the above implementations may be implemented by instructing related hardware through a computer program, the computer program may be stored in a non-transitory computer readable storage medium, and processes in various method implementations described above may be included when the computer program is executed. Any reference to a memory, storage, a database, or another medium used in various implementations provided in the present application may include non-transitory and/or transitory memories. The non-transitory memory may include a Read Only Memory (ROM), a Programmable ROM (PROM), an Electrically Programmable ROM (EPROM), an Electrically Erasable Programmable ROM (EEPROM), or a flash memory. The transitory memory may include a Random Access Memory (RAM) or an external cache memory. By way of illustration but not limitation, a RAM is available in various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

Various technical features in the above implementations may be combined arbitrarily. For the sake of brevity of the description, not all possible combinations of various technical features in the above implementations are described. However, as long as there is no conflict in the combinations of these technical features, they should be considered as falling within the scope specified in this specification. The implementations described above only provide several implementation modes of the present application, and description thereof is relatively specific and detailed, but is not to be interpreted as limitations to the protection scope of the present disclosure. It should be noted that without departing from the conception of the present application, those of ordinary skill in the art may also make a number of variations and improvements, which shall fall into the protection scope of the present application. The protection scope of the present application is subject to the appended claims.

The invention claimed is:

1. An information configuration method, comprising:
    sending, by a first User Equipment (UE), parameter information to a network device; wherein the parameter information indicates a related parameter of data transmission and reception performed by a second UE aiming at the first UE; wherein the parameter information indicates information of data reception performed by the first UE, the parameter information comprises at least one of a period, a time offset, and a timer length;
    receiving, by the first UE, configuration information sent by the second UE; wherein the configuration information is information acquired by the second UE from the network device and used for indicating a data transmission and reception related parameter under a power saving mechanism of a side link between the first UE and the second UE;
    sending, by the first UE, a response message to the second UE; wherein the response message is used for indicating whether the first UE accepts the data transmission and reception related parameter indicated by the configuration information.

2. The information configuration method according to claim 1, wherein the method further comprises:

sending, by the first UE, parameter information to the second UE; wherein the parameter information indicates a related parameter of data transmission and reception performed by the first UE aiming at the second UE.

3. The information configuration method according to claim 1, wherein the configuration information indicates at least one piece of following information:

parameter information received aiming at the first UE; and parameter information sent aiming at the second UE.

4. An information configuration method, wherein the method comprises:

receiving, by a network device, parameter information sent by a first User Equipment (UE); wherein the parameter information indicates a related parameter of data transmission and reception performed by a second UE aiming at the first UE; wherein the parameter information indicates information of data reception performed by the first UE, the parameter information comprises at least one of a period, a time offset, and a timer length;

sending, by the network device, configuration information to the first UE; wherein the configuration information is used for indicating a data transmission and reception related parameter under a power saving mechanism of a side link between the first UE and the second UE.

5. The information configuration method according to claim 4, wherein the configuration information indicates at least one piece of following information:

parameter information sent aiming at the first UE; and parameter information received aiming at the second UE.

6. An information configuration apparatus, applied in a first User Equipment (UE), comprising a transceiver and a processor, wherein the processor is used to send parameter information to a network device; wherein the parameter information indicates a related parameter of data transmission and reception performed by a second UE aiming at the first UE; wherein the parameter information indicates information of data reception performed by the first UE, the parameter information comprises at least one of a period, a time offset, and a timer length;

the processor is used to receive configuration information sent by the second UE through the transceiver; and the configuration information is information acquired by the second UE from the network device and used for indicating a data transmission and reception related parameter under a power saving mechanism of a side link between the first UE and the second UE;

the transceiver is used to send a response message to the second UE; wherein the response message is used for indicating whether the first UE accepts the data transmission and reception related parameter indicated by the configuration information.

7. The information configuration apparatus according to claim 6, wherein the transceiver is further used to send parameter information to the second UE; wherein the parameter information indicates a related parameter of data transmission and reception performed by the first UE aiming at the second UE.

8. The information configuration apparatus according to claim 6, wherein the configuration information indicates at least one piece of following information:

parameter information received aiming at the first UE; and parameter information sent aiming at the second UE.

* * * * *